United States Patent

[11] 3,585,444

| [72] | Inventors | Paul E. Crowley<br>Naperville;<br>James B. White, Geneva, both of, Ill. |
|---|---|---|
| [21] | Appl. No. | 761,706 |
| [22] | Filed | Sept. 23, 1968 |
| [45] | Patented | June 15, 1971 |
| [73] | Assignee | Don Haskins, Inc.<br>Geneva, Ill. |

[54] ENERGY SUPPLY CIRCUIT
9 Claims, 4 Drawing Figs.

[52] U.S. Cl............................................................ 315/240,
315/202, 315/205, 315/209, 315/241, 315/245,
315/272, 315/273, 315/275, 307/252, 307/296
[51] Int. Cl.............................................................. H05b 37/00
[50] Field of Search............................................ 315/240,
241, 209 CD, 241 S, 241 P, 202, 205, 245, 272,
273, 275, 287; 320/1; 307/252, 293, 252.70, 246;
321/46, 47

[56] References Cited
UNITED STATES PATENTS

| 3,237,052 | 2/1966 | Sokolov........................ | 315/241X |
| 3,428,863 | 2/1969 | Wright.......................... | 315/241 |
| 3,450,940 | 6/1969 | Linkroum...................... | 315/241X |

*Primary Examiner*—John W. Huckert
*Assistant Examiner*—R. F. Polissack
*Attorney*—Hume, Clement, Hume & Lee ABSTRACT: A circuit for supplying a high energy discharge to a load, for example a strobotron. A capacitor is adapted to be charged from an alternating current source and to discharge its stored energy into the load. A half-wave rectifier permits charging of the capacitor only during each half-cycle forward pulse of the source current. A gated conductive device in series with the capacitor can, by suitable control of the gate and cathode voltages, be made to (1) delay the delivery of charging current to the capacitor for a finite interval after initiation of the half-cycle pulse, (2) limit the maximum instantaneous charging current delivered to the capacitor, and/or (3) increase the average charging current delivered to the capacitor as the latter accumulates charge.

ENERGY SUPPLY CIRCUIT

BACKGROUND

This invention relates to an energy supply circuit and, more particularly, to novel circuitry for rapid charging of a capacitor adapted to discharge its stored energy into a load, as for example a strobotron. Although an exemplary embodiment of the invention will, for convenience, be described in the context of power supply circuitry for a strobe light, it should be understood that the invention is equally suitable for use in any application where it is desired to effect rapid charging of a power capacitor.

Innumerable circuits for charging capacitors have been devised in the past. A recurrent problem encountered in connection with the design of such circuits has involved the fact that fully discharged capacitors present an extremely low impedance to the flow of electrical current, and the resulting high current flow during the initial stage of the charging of such a capacitor may, if unregulated, exceed maximum tolerable limits. Accordingly, it is usually necessary in the design of such charging circuits to provide means for limiting the current flow to, or charging rate of, the capacitor. Typically, such means have taken the form of a current limiting resistor. This solution to the problem, however, is not entirely satisfactory inasmuch as the efficiency of the system is greatly impaired due to the heat loss generated in the resistive element. Moreover, aside from considerations of efficiency, this generation of heat is in itself undesirable, since it may damage other circuit components and may require relatively expensive or unwieldy cooling devices.

It has now been found that rapid and efficient charging of a power capacitor can be achieved by employing half-cycle pulses from a source of alternating potential as the operative energy for charging the capacitor. In addition, by employing a controlled conductive device in series with the capacitor, such a circuit can be made to deliver charging current to the capacitor only during a selected terminal portion of each half-cycle pulse. Also, through suitable control of the conductive device, the instantaneous charging current delivered to the capacitor can be limited to a preselected maximum, and the average charging current delivered to the capacitor can, contrary to the natural characteristic of the capacitor, be made to increase as the charge accumulated by the capacitor increases. Thus, through proper control of the conductive device, the circuit can be made to regulate the width, amplitude and frequency of the charging current pulses delivered to the capacitor.

In order to accomplish these functions, the present invention contemplates a novel energy supply circuit including a source of alternating potential, energy storage or capacitive means, and a load. The capacitive means is adapted to be charged by the potential source, and is adapted to discharge, in the form of a high energy pulse, into the load upon signal from extraneous circuitry. In order to provide for charging of the capacitive means during no more than one half cycle in each full cycle of the potential source, a half-wave rectifier is placed in series with the source and the capacitive means. Thus, the capacitive means can receive energy from the source only during each forward half-cycle pulse, or 50 percent of the time.

By including a controlled conductive device in series with the source, the rectifier and the capacitor, the duty cycle can be further controlled, as can the amplitude and frequency of the charging current pulses delivered to the capacitor. By controlling the voltage differential between the gate electrode and the cathode of the controlled conductive device through a delay circuit responsively associated with the initiation of the positive half-cycle, the conductive device can be made to pass current to the capacitor during only a terminal portion of the half-cycle, thus effectively regulating the width of the pulses delivered to the capacitor. By controlling the gate voltage differential in a manner responsive to the instantaneous current being delivered to the capacitor, the conductive device can be made to pass current only when that current is less than a preselected maximum value, thus regulating the amplitude of the charging current pulses. Finally, by further controlling the gate voltage differential in a manner responsive to the charging of the capacitor, the conductive means can be made to pass pulses of current to the capacitor at a rate which increases as the charge accumulated by the capacitor increases, thus regulating the frequency of the charging pulses.

The foregoing and other advantages and features of the invention will be more fully understood by considering the remainder of the specification and claims, with illustrative reference to the drawing, in which:

DETAILED DESCRIPTION OF EXEMPLARY EMBODIMENT

Figure 1:
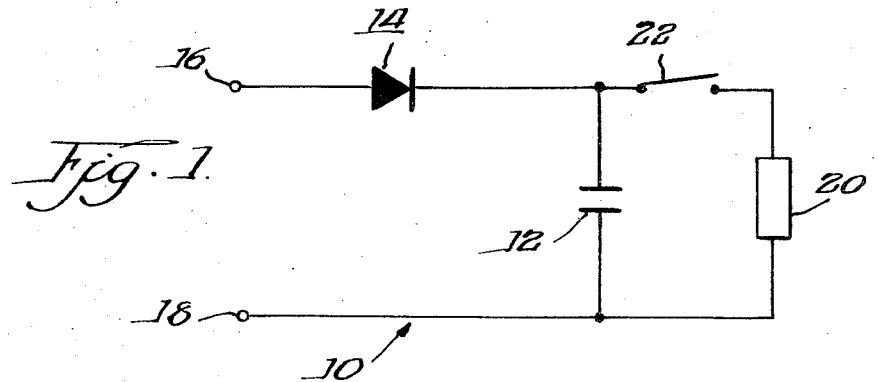
FIG. 1 is a schematic diagram of an energy supply circuit employing certain features of the present invention.

With reference to the drawing, FIG. 1 illustrates a novel energy supply circuit 10 constructed in accordance with the present invention. As shown therein, the circuit 10 includes a capacitive means or power capacitor 12 in series with a half-wave rectifier 14, which may be a diode or other suitable rectifying device. The series circuit including the capacitor 12 and the diode 14 is completed by the terminals 16 and 18, across which may be attached a suitable source of alternating potential (not shown). A second circuit, associated in parallel with the capacitor 12, includes a load 20 and a switch 22.

As can be seen from FIG. 1, the diode 14 will pass current to the capacitor 12 only when the potential source impressed across the terminals 16 and 18 is in its forward half-cycle. Thus, the charging current delivered to the capacitor 12 will be in the form of discrete pulses, resulting in a charging duty cycle of 50 percent. In this manner, the average charging current delivered to the capacitor 12 is limited to 50 percent of that which would be delivered through the use of a full wave rectifier operating in the same circuit. And this reduction in average charging current is accomplished without the need for a current limiting resistor and, hence, without the generation of undesirable heat loss. When the capacitor 12 is fully charged, its stored energy may be discharged into the load 20 by closing the switch 22.

Figure 2:
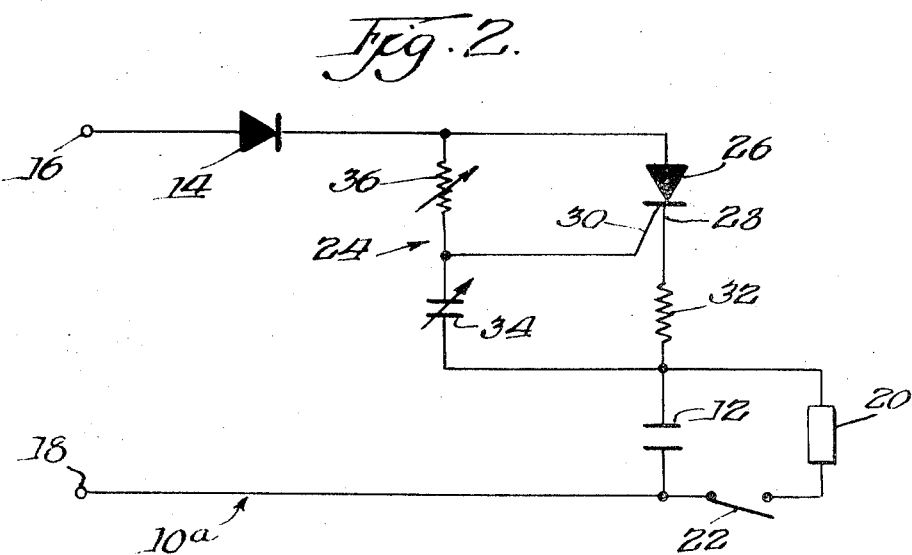
FIG. 2 is a schematic diagram similar to that of FIG. 1, illustrating circuit means for controlling duty cycle.

FIG. 2 illustrates a modified form 10a of the circuit shown in FIG. 1. Again, the circuit 10a includes the capacitor 12, the diode rectifier 14, the terminals 16 and 18, the load 20 and the switch 22. In addition, however, the circuit 10a includes control means, generally designated by the numeral 24, for further regulating the effective charging duty cycle.

The control means 24 includes a controlled conductive device 26, which is in series with the diode 14, the capacitor 12 and the potential source impressed across the terminals 16 and 18. The conductive device 26, which may be a silicon controlled rectifier or other suitable gated device, has a cathode 28 and a gate or control electrode 30. A resistive element 32 is interposed between the cathode 28 and the capacitor 12. A capacitor 34 is connected to the gate electrode 30 of the device 26 with reference to the low side of the resistive element 32, and another resistor 36 is likewise connected to the control gate 30 and is associated in parallel relationship across the conductive device 26. The conductive device 26 is of the type which permits the forward passage of current therethrough only when the voltage as the gate electrode 30 differs from that present at the cathode 28 by at least a predetermined amount, as for example one volt. Thus, the conductive device 26 will permit delivery of charging current pulses to the capacitor 12 only when a voltage differential of at least one volt exists between the gate electrode 30 and the cathode 28. Accordingly, at the initiation of a forward half-cycle pulse of energy from the alternating potential source, the voltages present at the gate electrode 30 and the cathode 28 are essentially the same, assuming that the capacitor 34 is fully discharged. Only when sufficient charge is accumulated in the capacitor 34 will the voltage at the gate electrode 30 rise to a value sufficient to fire the conductive device 26 and permit the passage of charging current therethrough. Thus, it can be seen that, by suitable selection of the values of the capacitor 34 and/or the resistor 36, the firing of the conductive device 26 can be delayed a selected interval of time after the initiation of a forward half-cycle pulse of energy from the alternating potential source. Rather than permitting the delivery of charging current to the capacitor 12 during the entire forward half-current, current delivery can be limited to only a selected terminal portion of the pulse. The duty cycle can be made to assume any desired value, from 0 to 50 percent of the full cycle of the source, simply by varying the width of the pulse delivered through the conductive device 26. As shown in FIG. 2, the capacitor 34 and the resistor 36 are designated as variable circuit elements. It will be understood, however, that the elements 34 and/or 36 might also be fixed, and that the provision of variable circuit elements is intended to permit adjustability of the pulse width or duty cycle.

Figure 3:
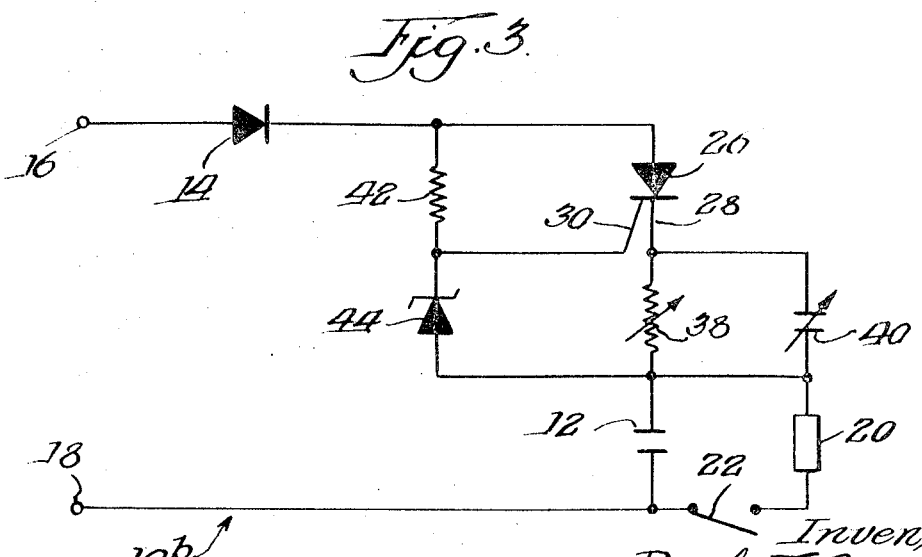
FIG. 3 is a schematic diagram similar to that of FIG. 1, illustrating circuitry for controlling instantaneous and average charging current.

FIG. 3 illustrates a third energy supply circuit 10b which, like the circuit 10 of FIG. 1, also includes a power capacitor 12, a diode 14, a potential source associated with the terminals 16 and 18, a load 20 and a switch 22. Again as in FIG. 2, the circuit 10b includes a gated conductive device 26 in series with the diode 14 and the capacitor 12. Interposed between the cathode 28 of the conductive device 26 and the capacitor 12 are a resistive element 38 and a capacitive element 40, arranged in parallel. Connected to the gate electrode 30 across the conductive device 26 is another resistor 42. Likewise attached to the gate electrode 30 is a regulated voltage device 44, which may be a Zener diode or other equivalent element which functions to limit the maximum voltage which may be impressed thereacross.

Again, as in the case of the circuit of FIG. 2, the conductive device 26 passes charging current pulses to the capacitor 12 only when at least the predetermined voltage differential exists between the gate electrode 30 and the cathode 28. The resistive element 38 is, in the circuit 10b, selected to limit the maximum instantaneous current passing therethrough. Since the Zener diode 44 is a voltage regulating device, the voltage present at the gate electrode 30 can never exceed the rated breakdown value or Zener voltage of the diode 44. Thus, if at any time the current through the resistor 38 should create a voltage drop thereacross which raises the cathode voltage to within (for example) one volt of the gate electrode voltage, the conductive device 26 will cease to pass current. It can be seen from this that with proper selection of the value of the resistor 38, the amplitude of the current pulses which are delivered to the capacitor 12 can be limited to any predetermined value. Thus, in the event of any circuit malfunction, such as a leak in the capacitor 12, the remaining circuit components will be protected from injury.

The circuit 10b of FIG. 3 also includes means for regulating the frequency with which charging current pulses are delivered to the capacitor 12. As is well known, the normal response of an uncharged capacitor is to present an extremely low impedance during the initial stages of charging, and an increasingly greater impedance as charge accumulates. It is desirable, however, to effectively reverse this characteristic, so that the rate of charging is low during the initial charging stage, and increases as the capacitor accumulates energy. To this end, the capacitor 40 is placed in parallel across the current limiting resistor 38. Upon initiation of a current pulse through the diode 14, when the capacitor 12 is fully discharged, the capacitor 40 will present an extremely low impedance, and will quickly accumulate charge, as will the capacitor 12. When the current pulse terminates, the capacitor 40 will immediately begin to bleed its accumulated charge through the resistor 38. Nevertheless, the accumulated charge on the capacitor 40 will crate a voltage at the cathode 28 sufficient to prohibit firing of the conductive device 26, and this condition will persist through several additional pulse cycles of the alternating source. When sufficient charge has been dissipated in the resistor 38, the voltage at the cathode 28 will again fall to a point which permits the firing of the conductive device 26. Thus, upon initiation of a forward pulse through the diode 14, the capacitors 40 and 12 will again begin to accumulate charge. At this point, however, a much larger voltage drop appears across the capacitor 12 due to its partially charged state. Thus, the charge accumulated by the capacitor 40 during the duration of the pulse is less than it was when the capacitor 12 was fully discharged. At the termination of the forward pulse, the capacitor 40 will again begin to bleed charge into the resistor 38. However, due to the fact that it has less accumulated charge, the voltage at the cathode 28 will drop more quickly, and the conductive device 26 will remain turned off for fewer pulse cycles. This process continues to repeat itself until the capacitor 12 is fully charged, with the conductive device 26 remaining off for increasingly shorter periods of time. Thus, in effect, the frequency of the charging current pulses delivered to the capacitor 12 increases as the charge accumulated by the capacitor 12 increases. Or, to put it another way, the average charging current delivered to the capacitor 12 increases in direct proportion to the charge on the capacitor 12. Again, either or both of the elements 38 and 40 may be fixed rather than variable.

Thus it can be seen that the circuit 10a of FIG. 2 has provision for regulating the pulse width of the charging current, while the circuit 10b of FIG. 3 provides for the regulation of both the pulse amplitude and pulse frequency.

Figure 4:
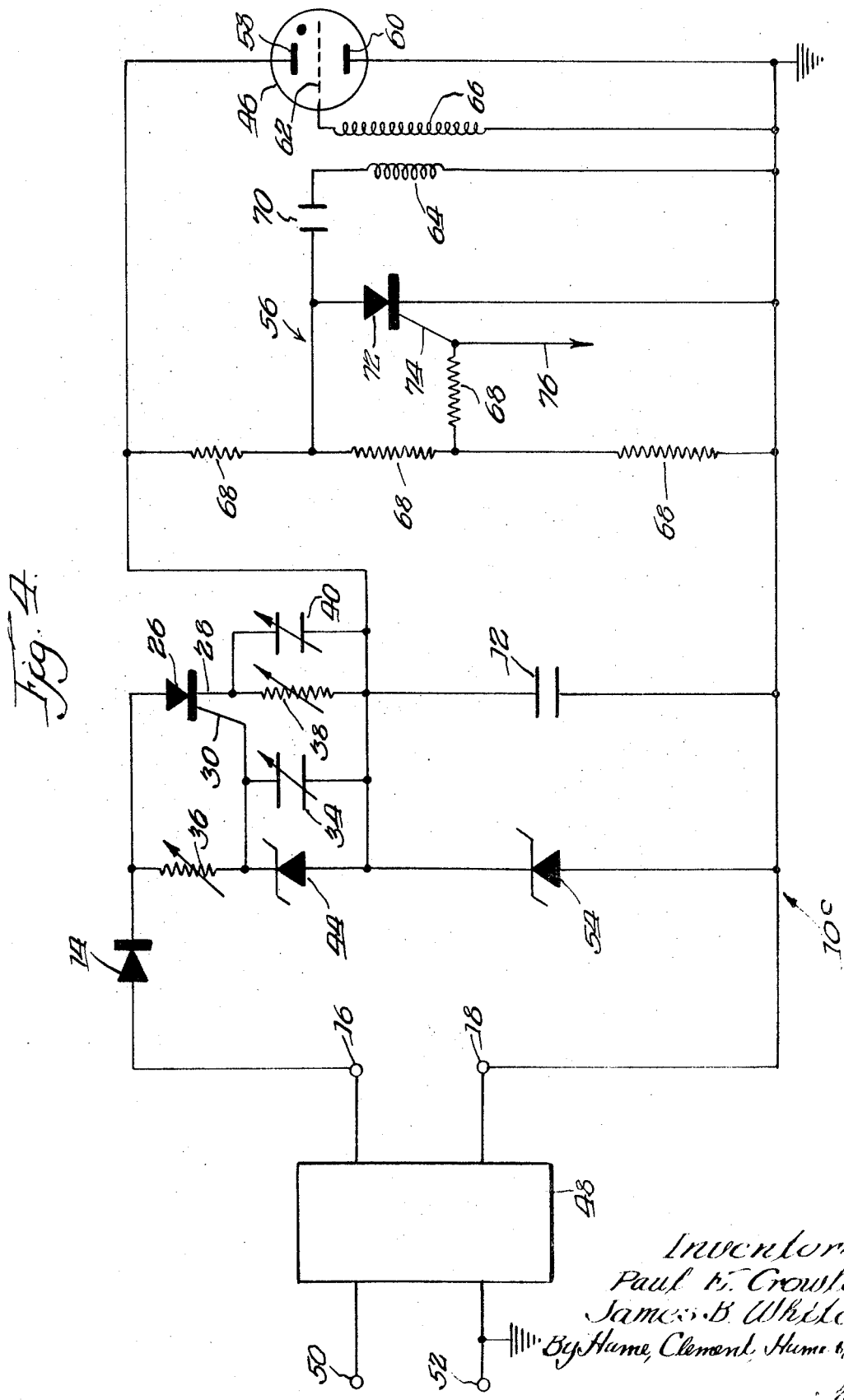
FIG. 4 is a schematic diagram of a strobotron power supply circuit constituting an exemplary embodiment of the present invention.

Turning now to FIG. 4, there is illustrated a power supply circuit 10c for a strobotron which combines the features of the circuits 10, 10a and 10b described above. Again, as in the case of those circuits, the circuit 10c includes a power capacitor 12, a diode 14, a pair of terminals 16 and 18, and a load which in this case is a strobotron 46. Connected across the terminals 16 and 18 is an alternating potential source 48 having a pair of input terminals 50 and 52. The potential source 48 may be a conventional oscillator operating on a direct-current power source impressed across the terminals 50 and 52. Alternatively, the potential source 48 might constitute a transformer which is supplied with ordinary alternating current at the terminals 50 and 52.

The control circuitry for regulating the pulse width, amplitude and frequency is similar to that described above in connection with FIGS. 2 and 3. The controlled conductive device 26 again constitutes the principal control element, and the various pulse characteristics are regulated by controlling the voltage differential between the cathode 28 and the gate electrode 30. Thus, the circuit consisting of the capacitor 34 and the resistor 36 operates to delay the buildup of voltage at the gate 30 and in so doing controls the pulse width. By suitable adjustment of the values of the capacitor 34 and/or the resistor 36, the time constant of that circuit can be selected to vary the duty cycle of the charging pulse from 0 to 50 percent. Similarly, due to the fact that the Zener diode 44 regulates the maximum voltage at the gate electrode 30, the resistor 38 controls the maximum instantaneous charging current or pulse amplitude which is delivered to the capacitor 12 by controlling the voltage at the cathode 28. In like fashion, the capacitor 40 in conjunction with the resistor 38 and the Zener diode 44 controls the frequency at which the necessary voltage differential between the cathode 28 and the gate electrode 30 is established.

Due to the fact that the total instantaneous charging current may be limited to a predetermined maximum value in the circuit 10c, it is also possible to insert a second Zener diode 54 across the capacitor 12 to limit the maximum voltage drop across the capacitor, and perit the use of unregulated potential sources. The use of a Zener diode for this purpose has heretofore been practically impossible due to the present relatively low state of the art respecting current ratings for such devices. In the circuit 10c, however, the maximum current may be limited to any desired value, and this value may be chosen to fall within the rating of currently available Zener devices.

In order to discharge the energy accumulated by the capacitor 12 into the strobotron 46, there is provided a trigger circuit generally designated by the numeral 56. The strobotron 46, which may be a high intensity Xenon lamp or other suitable device, is essentially a gas filled triode including an anode 58, a cathode 60 and a control electrode 62. The voltage across the power capacitor 12 always appears across the electrodes 58 and 60 of the strobotron 46. However, until a high voltage pulse is delivered to the control electrode 62, the strobotron will not conduct and the energy stored in the capacitor 12 will not be delivered thereto. Accordingly, the trigger circuit 56 is designed to provide a high voltage pulse to the control electrode 62 upon command from a timer circuit (not shown).

To this end, the trigger circuit 56 employs a transformer having a primary 64 and a secondary 66, the latter being connected to the control electrode 62. A voltage dividing network consisting of a plurality of resistors 68 functions to permit charging of a capacitor 70 which is connected to the primary 64 of the transformer. A gated conductive device such as a silicon controlled rectifier 72 having a gate electrode 74 is connected across the primary 64 and the capacitor 70 to provide a closed series circuit therewith. A conductor 76, which is connected to the gate electrode 74, communicates with the timing circuit.

During the charging of the capacitor 12, the capacitor 70 also accumulates a charge which cannot escape to ground due to the fact that the conductive device 72 is in its nonconductive state. However, when the capacitor 12 becomes fully charged, the gate electrode 74 receives a signal from the timing circuit through the conductor 76, thus causing the conductive device 72 to fire. The consequent discharge of the capacitor 70 causes a voltage pulse in the primary 64 and a corresponding higher induced voltage in the secondary 66. This induced voltage in the secondary 66 fires the strobotron 46 and permits the energy stored in the capacitor 12 to be utilized therein.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention as set forth in the following claims.

We claim:
1. A circuit for supplying energy to a load, comprising:
an alternating potential source;
first capacitive means connected to discharge energy into said load;
half-wave rectifier means; and
circuit means including said rectifier means, a controlled conductive element and an RC circuit means adapted to permit the charging of said first capacitive means only during a terminal portion of a half-cycle of said source.
2. The circuit of claim 1 wherein said circuit means includes means for limiting the instantaneous maximum charging current delivered to said capacitive means.
3. The circuit of claim 2 wherein said current limiting means is further adapted to permit an increase in the average charging current delivered to said first capacitive means as the charge accumulated in said first capacitive means increases.
4. The circuit of claim 1 wherein said controlled conductive element includes a cathode and a control electrode, said element being connected in series with said rectifier and said first capacitive means, said element permitting delivery of charging current to said first capacitive means only when at least a predetermined voltage differential exists between said cathode and said control electrode.
5. The circuit of claim 4 wherein said RC circuit means provides a preselected time delay between the initiation of said half-cycle and the establishment of said voltage differential.
6. The circuit of claim 4 wherein said circuit means includes current limiting means for disestablishing said voltage differential when the charging current delivered to said first capacitive means reaches a predetermined maximum.
7. The circuit of claim 4 wherein said circuit means includes means responsive to the charging of said first capacitive means to control the frequency of establishment of said voltage differential.
8. The circuit of claim 6 including voltage reference means connected across said first capacitive means for limiting the maximum voltage drop across said first capacitive means.
9. A strobotron system comprising: a strobotron having a control electrode; means for supplying a high voltage pulse to said control electrode at selected intervals to fire said strobotron; a capacitor adapted to discharge stored energy to said strobotron during firing thereof; a source of alternating current; a half-wave rectifier in series with said source and said capacitor; a gated rectifier in series with said source, said half-wave rectifier and said capacitor; a time delay circuit for controlling the gate voltage of said gated rectifier in delayed response to the initiation of current flow through said half-wave rectifier; a current limiting circuit for controlling said gate voltage in response to current through said gated rectifier; and a frequency control circuit for controlling said gate voltage in response to the charging of said capacitor.